United States Patent
Jenks et al.

(10) Patent No.: US 11,242,816 B1
(45) Date of Patent: Feb. 8, 2022

(54) SYSTEMS AND METHODS FOR REVERSE FLOW DETECT

(71) Applicant: Caterpillar Inc., Peoria, IL (US)

(72) Inventors: Julia H. Jenks, Edwards, IL (US);
Prasanna M. Ballal, Dunlap, IL (US);
Shawn M. Damm, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/071,057

(22) Filed: Oct. 15, 2020

(51) Int. Cl.
*F02D 41/22* (2006.01)
*F02D 41/00* (2006.01)
*F02D 17/04* (2006.01)
*F02D 19/06* (2006.01)

(52) U.S. Cl.
CPC ............ *F02D 41/22* (2013.01); *F02D 17/04* (2013.01); *F02D 19/0623* (2013.01); *F02D 19/0628* (2013.01); *F02D 19/0642* (2013.01); *F02D 41/0027* (2013.01); *F02D 2041/224* (2013.01); *F02D 2200/0406* (2013.01); *F02D 2200/0602* (2013.01); *F02D 2200/10* (2013.01)

(58) Field of Classification Search
CPC ... Y02T 10/30; F02D 41/0025; F02D 19/081; F02D 41/0027; F02D 19/0647; F02D 19/0644; F02D 19/0642
USPC ................ 123/575, 576, 577, 578
See application file for complete search history.

(56) References Cited

U.S. PATENT DOCUMENTS

| | | | |
|---|---|---|---|
| 6,543,395 B2 | 4/2003 | Green | |
| 6,890,490 B1* | 5/2005 | Fujita | F02B 43/10 |
| | | | 422/112 |
| 9,644,556 B2 | 5/2017 | Pursifull et al. | |
| 9,689,335 B2 | 6/2017 | Ge | |
| 10,337,421 B2 | 7/2019 | Hirose et al. | |
| 2014/0032083 A1* | 1/2014 | Kerns | F02M 26/43 |
| | | | 701/105 |
| 2015/0267631 A1* | 9/2015 | Miyamoto | F02M 21/0284 |
| | | | 123/445 |
| 2017/0234245 A1 | 8/2017 | Bruner et al. | |
| 2018/0149096 A1 | 5/2018 | Johns et al. | |
| 2019/0032543 A1* | 1/2019 | Koshiba | F02M 21/0218 |

* cited by examiner

*Primary Examiner* — Sizo B Vilakazi
(74) *Attorney, Agent, or Firm* — Bookoff McAndrews PLLC (57) ABSTRACT

Systems and methods for reverse flow detection for a dual fuel engine are disclosed. The engine may include an intake manifold, a liquid fuel supply line and a gaseous fuel supply line, the gaseous fuel supply line including a gaseous fuel supply and a gaseous fuel rail. The method may include: receiving sensed values of gaseous fuel supply pressure, intake manifold pressure, and gaseous fuel rail pressure; determining a threshold value based on the sensed value of gaseous fuel supply pressure; determining a reverse flow in the gaseous fuel supply line based on the sensed values of gaseous fuel supply pressure and gas rail pressure and the determined threshold value; and outputting an indication of reverse flow in response to the determination of reverse flow.

20 Claims, 3 Drawing Sheets

SYSTEMS AND METHODS FOR REVERSE FLOW DETECT

TECHNICAL FIELD

The present disclosure relates generally to dual fuel engines, and more particularly, to systems and methods for reverse flow detection for dual fuel engines.

BACKGROUND

Some internal combustion engines, known as dual fuel engines, are configured to run on two different fuels. For example, such engines may operate on diesel fuel supplied through a diesel fuel supply system and natural gas supplied through a gas supply system. When switching from a natural gas mode to a diesel fuel only mode, it is important to prevent reverse flow of air from an air intake system into the gas supply system during the diesel fuel only mode. Reverse flow in the gas supply system could result in a flammable mixture being created and could pose a safety risk when the engine is operated again in the natural gas mode.

U.S. Publication No. 2018/0149096, published by Johns on May 31, 2018 ("the '096 publication"), describes a hybrid fuel supply system for diesel and other fuel injected internal combustion engines. The system of the '096 publication includes separate liquid fuel and compressed hydrogen gas sources. The system includes a hydrogen gas supply module that calculates or "maps" instant liquid fuel requirements based on engine size and capacity and at least one parameter output from the engine's control unit (ECU). The system uses the mapped instant liquid fuel requirements to derive an instant volume of hydrogen gas for addition to the engine's fuel injection system. The system further controls the hydrogen gas pressure to be suitable for mixing with intake air at low engine speeds and also increases the hydrogen gas pressure when the air pressure in the air intake manifold is boosted by the turbocharger. However, the system of the '096 publication is not disclosed as determining if reverse flow occurs through the gas supply line.

The systems and methods for reverse flow detection of the present disclosure may solve one or more of the problems set forth above and/or other problems in the art. The scope of the current disclosure, however, is defined by the attached claims, and not by the ability to solve any specific problem.

SUMMARY

In one aspect, a method for detecting reverse flow for a dual fuel engine, the engine including an intake manifold, a liquid fuel supply line and a gaseous fuel supply line, the gaseous fuel supply line including a gaseous fuel supply and a gaseous fuel rail is disclosed. The method may include: receiving sensed values of gaseous fuel supply pressure, intake manifold pressure, and gaseous fuel rail pressure; determining a threshold value based on the sensed value of gaseous fuel supply pressure; determining a reverse flow in the gaseous fuel supply line based on the sensed values of gaseous fuel supply pressure and gas rail pressure and the determined threshold value; and outputting an indication of reverse flow in response to the determination of reverse flow.

In another aspect, a method for detecting reverse flow for a dual fuel engine, the engine including an intake manifold, a liquid fuel supply line and a gaseous fuel supply line, the gaseous fuel supply line including a gaseous fuel supply and a gaseous fuel rail is disclosed. The method may include: receiving sensed values of gaseous fuel supply pressure, intake manifold pressure, and gaseous fuel rail pressure; comparing the sensed values of intake manifold pressure and gaseous fuel supply pressure; when the intake manifold pressure is greater than the gaseous fuel supply pressure, determining a threshold value based on the sensed value of gaseous fuel supply pressure, wherein the threshold value is determined based on a map representative of empirical data of threshold values with respect to gaseous fuel supply pressure and at least one of intake manifold pressure, engine load, or amount of liquid fuel being supplied to one or more cylinders of the engine; comparing the sensed values of gaseous fuel rail pressure and the gaseous fuel supply pressure plus the threshold value; when the gaseous fuel rail pressure is greater than or equal to the gaseous fuel supply pressure plus the threshold value, determining a reverse flow in the gaseous fuel supply line; and outputting an indication of reverse flow in response to the determination of reverse flow.

In yet another aspect, a reverse flow detection system for a dual fuel engine is disclosed. The system may include: an intake manifold for supplying intake air to the engine; a liquid fuel supply line for supplying liquid fuel to the engine; a gaseous fuel supply line including a gaseous fuel supply and a gaseous fuel rail for supplying gaseous fuel to the engine; and a controller configured to: receive sensed values of gaseous fuel supply pressure, intake manifold pressure, and gaseous fuel rail pressure; determine a threshold value based on the sensed value of gaseous fuel supply pressure; determine a reverse flow in the gaseous fuel supply line based on the sensed values of gaseous fuel supply pressure and gas rail pressure and the determined threshold value; and output an indication of reverse flow in response to the determination of reverse flow.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
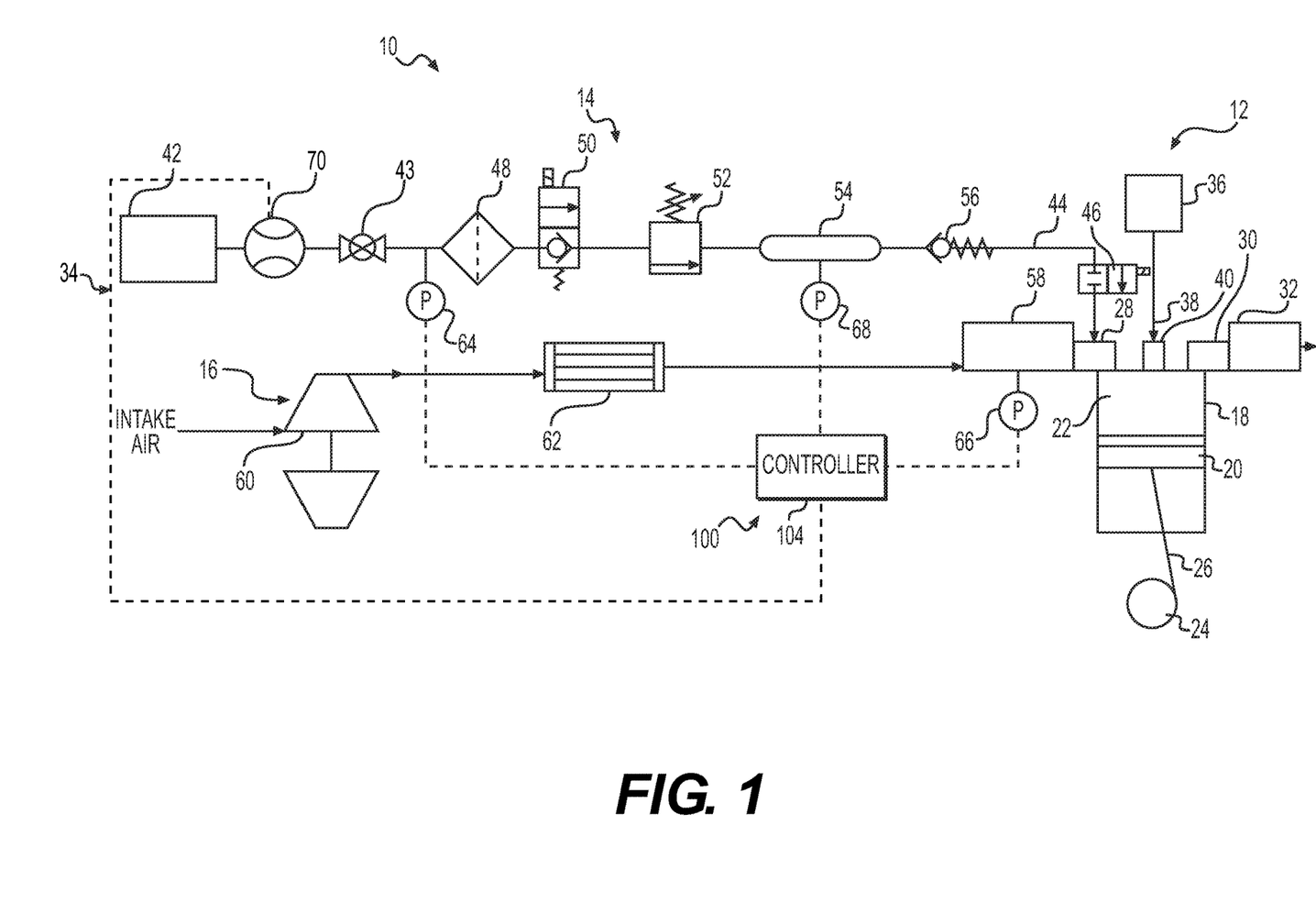
FIG. 1 is a schematic view of a dual fuel engine system having a reverse flow detection system, according to aspects of the disclosure.

FIG. 1 illustrates a schematic view of a dual fuel engine system 10 system having a reverse flow detection system 100. Dual fuel engine system 10 may be an internal combustion engine capable of operating on two fuels. For example, dual fuel engine system 10 may employ liquid fuel and/or gaseous fuel, or a combination of both liquid fuel and gaseous fuel. While diesel fuel is used in the exemplary embodiment, it is understood that any type of liquid fuel may be used, such as gasoline, methanol, ethanol, or any other type of liquid fuel. Further, as used herein, "gaseous fuel" may include fuel that is supplied to engine system 10 in gaseous form. Gaseous fuel may include, for example, natural gas, propane, bio-gas, landfill gas, carbon monoxide, hydrogen, or mixtures thereof. It is understood that engine system 10 may employ only a single fuel at one time (liquid or gaseous fuel), or may employ both the liquid fuel and the gaseous fuel in unison.

As shown in FIG. 1, dual fuel engine system 10 includes a diesel fuel delivery system 12 and a gaseous fuel delivery system 14. Dual fuel engine system 10 may also include an air intake system 16 and a plurality of engine cylinders 18 (a single engine cylinder 18 is depicted in FIG. 1). Diesel fuel delivery system 12 may deliver diesel fuel to cylinders 18, gaseous fuel system 14 may deliver gaseous fuel to cylinders 18, and intake system 16 may deliver intake air to cylinders 18, as detailed further below. Each engine cylinder 18 may include a piston 20 slidably and reciprocally disposed to form a combustion chamber 22 of the cylinder 18. The piston 20 of each cylinder 18 may be connected to a crankshaft 24 via a connecting rod 26 and may provide power to a flywheel (not shown) of the engine system 10, as detailed below. The cylinders 18 may also include an intake port 28 for providing an air (e.g., intake air) and fuel (e.g., gaseous fuel) mixture to the combustion chamber 22. Cylinder 18 may also include an exhaust port 30 for exhausting combustion gases from cylinder 18 to an exhaust system 32.

Diesel fuel delivery system 12 may include a diesel fuel supply 36, such as a diesel fuel tank, fuel pump, fuel rail, and a diesel fuel supply line 38 for supplying diesel fuel from supply 36 to cylinder 18. For example, diesel fuel may be supplied to each cylinder 18 via a diesel fuel injector 40. It is understood that diesel fuel delivery system 12 may include any number and/or combination of valves or other components known in the art.

Gaseous fuel delivery system 14 may include a gaseous fuel supply 42, such as a gas tank, and a gaseous fuel supply line 44 for supplying gaseous fuel from supply 42 to cylinder 18. For example, gaseous fuel may be supplied to each cylinder 18 via a gaseous fuel injector 46, such as a solenoid operated gas admission valve (SOGAV), through intake system 16, as detailed further below. Accordingly, gaseous fuel may flow from supply 42 through supply line 44 and into intake system 16. Gaseous fuel delivery system 14 may also include a manual shut off valve 43, a filter 48, a gas shut off valve (GSOV) 50, a regulator 52, a gaseous fuel rail 54, and a check valve 56.

Manual shut off valve 43 may be disposed downstream of supply 42. Valve 43 may include a ball valve, or the like, for preventing flow from supply 42 into gaseous fuel supply line 44 and towards cylinder 18. Accordingly, valve 43 may include a closed state for preventing flow from supply 42, and an open state for enabling flow from supply 42. Valve 43 may be manually actuated from the open state to the closed state to shut off, or otherwise prevent, flow of gaseous fuel from supply 42 towards cylinder 18. Similarly, valve 43 may be manually actuated from the closed state to the open state to enable flow of gaseous fuel from supply 42 towards cylinder 18. It is noted that valve 43 may be by default in the open state. Filter 48 may remove suspended liquids, dirt, and/or other particulates from the gaseous fuel to prevent the suspended liquids, dirt, and/or other particulates from clogging or damaging components of the gaseous fuel delivery system 14. Gas shut off valve 50 may be disposed in gaseous fuel supply line 44 downstream of supply 42. Valve 50 may include a closed state (shown in FIG. 1) and an open state. In the closed state, valve 50 may prevent flow of gaseous fuel from supply 42 into supply line 44.

Valve 50 may include a check valve, or the like, for preventing flow from supply 42 towards cylinder 18 when valve 50 is in the closed state, while allowing high pressure flow in the opposite, reverse direction (e.g., if the pressure in gaseous fuel supply line 44 is greater than the pressure of supply 42). In the open state, valve 50 may enable flow of gaseous fuel from supply 42 into supply line 44. In some embodiments, valve 50 may include a solenoid actuated valve, such that valve 50 may be automatically actuated in response to signals received from, for example, a controller 104. Regulator 52 may include a valve for reducing and regulating a pressure of the gaseous fuel exiting supply 42 and lowering the pressure to a predetermined level. Gaseous fuel rail 54 may distribute the gaseous fuel at a predetermined pressure to the gaseous fuel injectors 46 (only one injector is shown in FIG. 1). It is understood that valve 43, valve 50, regulator 52, and injector 46 may include any type of valves known in the art.

Check valve 56 may allow flow in one direction (e.g., from supply 42 towards intake system 16) and automatically prevent reverse flow, or back flow. As used herein, "reverse flow" is any type of flow in the opposite direction (e.g., from intake system 16 towards supply 42) back upstream in gaseous fuel supply line 44. Check valve 56 may include any type of check valve, such as ball check valve, disc check valve, diaphragm check valve, or any other type of valve for preventing flow in at least one direction.

Intake system 16 may include an air intake manifold 58. Intake manifold 58 may supply intake air to the cylinder 18. In some embodiments, gaseous fuel supply line 44 may be connected to the intake manifold 58 (e.g., via injector 46) for providing gaseous fuel to the intake manifold 58. Accordingly, intake manifold 58 may supply a gaseous fuel and air mixture to cylinder 18 (e.g., via intake port 28). Intake system 16 may also include a turbocharger 60 and an air cooler 62. Turbocharger 60 may include a turbine and compressor for compressing intake air, and cooler 62 may cool the compressed air. The turbine may also receive exhaust gases from exhaust port 30 of cylinders 18. Accordingly, cooled compressed air, or boost air, at a high pressure may be provided to inlet manifold 58, and thus to cylinder 18 to facilitate greater energy production. It is understood that intake system 16 may include any number and/or combination of valves or other components, as is known in the art.

Reverse flow detection system 100 includes a controller 104, such as an engine control module (ECM), and a sensor system 34 connected to controller 104. Sensor system 34 may include one or more pressure sensors and one or more flow sensors. The pressure sensors and flow sensors may be existing sensors already installed in engine system 10. For example, sensor system 34 may include a first pressure sensor 64, a second pressure sensor 66, and a third pressure sensor 68, and may also include a flow sensor 70. First pressure sensor 64 may be located in gaseous fuel supply line 44 immediately downstream of gaseous fuel supply 42 and may sense a gaseous fuel supply pressure. Second pressure sensor 66 may be located in intake manifold 58 and may sense intake manifold pressure. Third pressure sensor 68 may be located in gaseous fuel rail 54 and may sense a gaseous fuel rail pressure. It is understood that sensors 64, 66, 68 may include any type of sensors for sensing pressure, such as resistive sensors, capacitive sensors, piezoelectric sensors, optical sensors, micro electro-mechanical system sensors, or the like.

Flow sensor 70 may be located in, or otherwise connected to, gaseous fuel supply line 44 immediately downstream of gaseous fuel supply 42 and may sense a flow of gaseous fuel in gaseous fuel supply line 44. Flow sensor 70 may include, for example, a flowmeter that measures the amount of gaseous fuel that passes through the flowmeter during a time period to determine a flow rate (e.g., $ft^3/hr$) of the gaseous fuel in gaseous fuel supply line 44. It is understood that flow sensor 70 may include any type of sensor for sensing or measuring flow of gaseous fuel, such as obstruction type flowmeters, inferential flowmeters, electromagnetic sensors, positive-displacement sensors, fluid dynamic sensors, mass flowmeters, or the like. Further, sensor system 34 may include any number and/or combination of sensors as necessary.

Figure 2:
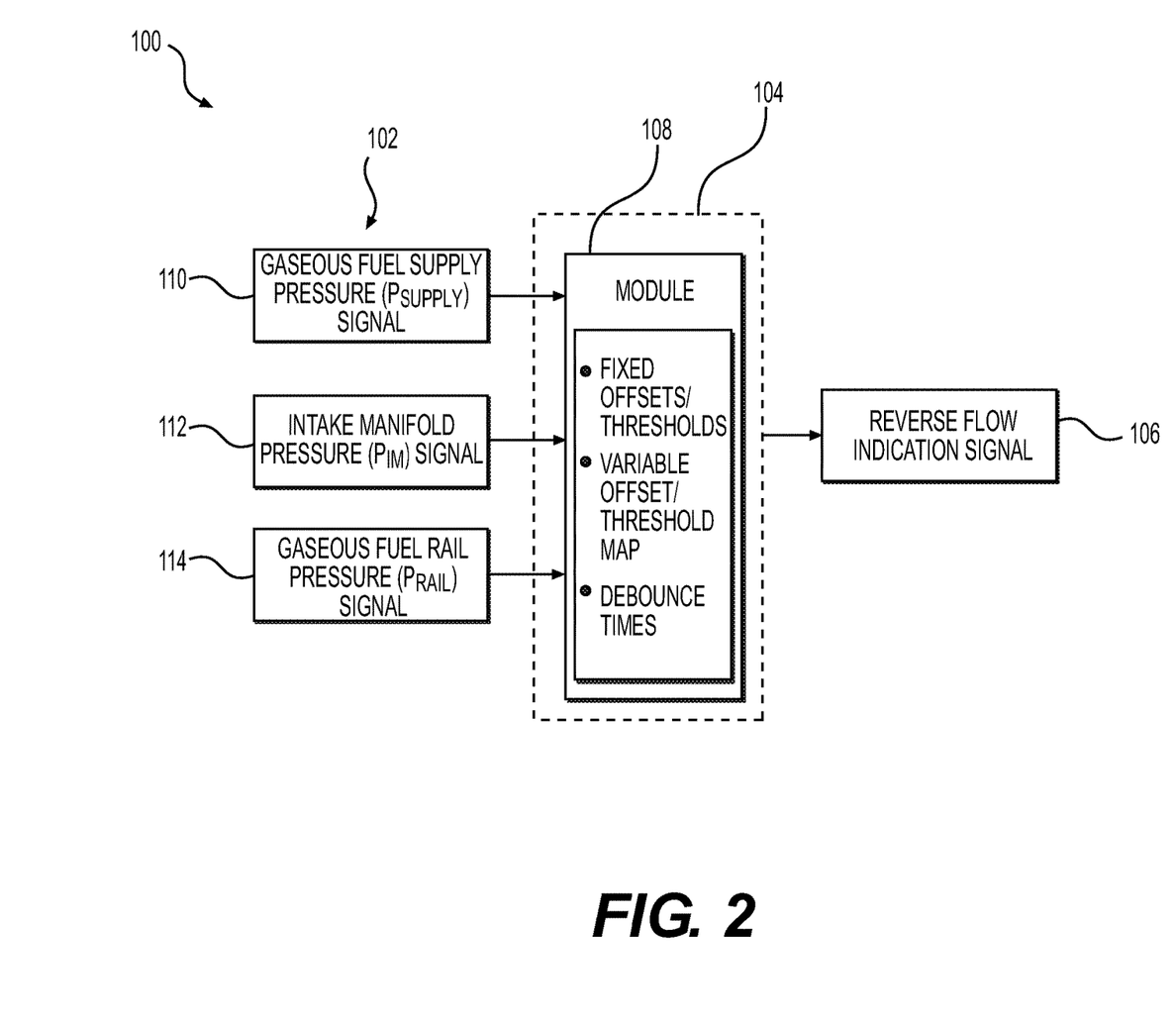
FIG. 2 is a schematic view of the exemplary reverse flow detection system for the dual fuel engine system of FIG. 1.

FIG. 2 illustrates a schematic view of the exemplary reverse flow detection system 100 for operation and/or control of at least portions of the dual fuel engine system 10. System 100 may include inputs 102, controller 104, and output 106. Inputs 102 may include, for example, gaseous fuel supply pressure ($P_{SUPPLY}$) signal 110 from first pressure sensor 64, intake manifold pressure ($P_{IM}$) signal 112 from second pressure sensor 66, and gaseous fuel rail pressure ($P_{RAIL}$) signal 114 from third pressure sensor 68. While the exemplary embodiment includes signals 110-114 from various pressure sensors 64-68, it is understood that inputs 102 may include other signals and/or derived values. For example, intake manifold pressure may relate, or otherwise correspond to, engine load and an amount of liquid fuel being injected or supplied to cylinder 18. Thus, inputs 102 may include an engine load signal and/or a liquid fuel signal. As used herein, "engine load" may be a capacity of engine system 10 to produce power (e.g., torque) in relation to a rated or maximum load at various speeds of engine system 10. Controller 104 may determine or derive engine load from various inputs including, for example, intake manifold pressure, torque produced by engine system 10, speed of engine system 10, amount of liquid fuel injected to cylinder 18, or any other input. Further, controller 104 may control the amount of liquid fuel being injected to cylinder 18, and thus may determine or derive the amount of liquid fuel being injected to cylinder 18. Output 106 may include, for example, a reverse flow indication signal. Controller 104 also includes a reverse flow detection module 108. Reverse flow detection module 108 may receive inputs 102, implement a method 300 for detecting reverse flow and control output 106, as described with reference to FIG. 3 below.

Controller 104 may embody a single microprocessor or multiple microprocessors that may include means for detecting reverse flow of the dual fuel engine system. For example, controller 104 may include a memory, a secondary storage device, a processor, such as a central processing unit, or any other means for accomplishing a task consistent with the present disclosure. The memory or secondary storage device associated with controller 104 may store data and/or software routines that may assist controller 104 in performing its functions, such as the functions of method 300 of FIG. 3. Further, the memory or secondary storage device associated with controller 104 may also store data received from the various inputs 102 associated with reverse flow detection system 100. Numerous commercially available microprocessors can be configured to perform the functions of controller 104. It should be appreciated that controller 104 could readily embody a general machine controller capable of controlling numerous other machine functions. Various other known circuits may be associated with controller 104, including signal-conditioning circuitry, communication circuitry, hydraulic or other actuation circuitry, and other appropriate circuitry.

Controller 104 may also include stored and/or derived values for use by module 108. For example, the stored values may include offsets (e.g., thresholds) and debounce times. The offsets may include a first offset and a second offset. The first and second offsets may be fixed (e.g., constant, non-varying) scalar values that are a threshold (e.g., pressure value) for being added to the gaseous fuel supply pressure ($P_{SUPPLY}$) values to avoid false trips in the reverse flow detection method 300. For example, the first offset may be a first threshold that is added to the gaseous fuel supply pressure during a first check, and the second offset may be a second threshold that is added to the gaseous fuel supply pressure during a second check, as detailed below. According to one aspect of this disclosure, during instances of relatively low pressure from gas supply 42 and/or when the gas supply 42 is turned off, for example, using a constant, non-varying second threshold value for all pressure levels of $P_{SUPPLY}$ and $P_{IM}$, may be inadequate in determining reverse flow during the second check. For example, a constant, non-varying second threshold value used for all pressure levels may allow for false positives (e.g., determination of reverse flow when no reverse flow actually exists) and/or false negatives (e.g., no determination of reverse flow when reverse flow actually exists) in some pressure levels.

Based on this, the present disclosure may include a map or look up table that provides a variable second threshold as a function of gaseous fuel supply pressure and intake manifold pressure. These variable map-based second thresholds may then be used for triggering a determination of reverse flow. For example, the map may plot intake manifold pressure ($P_{IM}$) versus gaseous fuel supply pressure ($P_{SUPPLY}$) as the x-axis and y-axis, respectively. The output for each value of $P_{IM}$ versus $P_{SUPPLY}$ is a respective second threshold value that module 108 may use in the determination of reverse flow, as detailed below. The information used to derive the second threshold values of the map or look-up table may be determined by empirical analysis. Such empirical data may be obtained, for example, by operating a test engine system 10 under predetermined conditions (e.g., under particular operating conditions) during, for example, bench testing. For example, the second threshold values may be correlated to the values of $P_{IM}$ versus $P_{SUPPLY}$. It is understood that the first threshold may be a constant, non-varying threshold and/or may also be a variable first threshold mapped (or in a look up table) as a function of various inputs.

To help determine and correlate the second threshold values to the values of $P_{IM}$ versus $P_{SUPPLY}$, module 108 may receive a gaseous fuel supply line flow signal from flow sensor 70 that indicates a flow rate in gaseous fuel supply line 44. Flow thresholds may include one or more thresholds of flow in the gaseous fuel supply line 44 for use in determining the map-based thresholds during testing. The flow thresholds may be calibrated to account for small amounts of sensed flows in gaseous fuel supply line 44 due to sensor resolution when gaseous fuel supply 42 is turned off.

During testing, a technician and/or module 108 may test various second threshold values for various values of $P_{IM}$ versus $P_{SUPPLY}$. For each test, the technician and/or module 108 may compare the flow in gaseous fuel supply line 44 to the flow threshold. If the flow is greater than the threshold (e.g., reverse flow actually exists in gaseous fuel supply line 44), the technician and/or module 108 may determine the second threshold value for the respective values of $P_{IM}$ versus $P_{SUPPLY}$. If the flow is less than the threshold (e.g., there is no reverse flow in gaseous fuel supply line 44), the technician and/or module 108 may test a new second threshold value for the various values of $P_{IM}$ versus $P_{SUPPLY}$. The technician and/or module 108 may refine the second threshold values for the various values of $P_{IM}$ versus $P_{SUPPLY}$ based on the sensed flow in gaseous fuel supply line 44. Thus, the second threshold values may be mapped for $P_{IM}$ versus $P_{SUPPLY}$. Additionally, or alternatively, in some embodiments, the technician and/or module 108 may determine the second threshold value by determining at which point the flow indicates reverse flow. For example, the technician and/or module 108 may determine the second threshold value at the moment (e.g., or shortly thereafter) the flow becomes greater than the flow threshold.

While the exemplary embodiment details the second threshold values as a function of $P_{IM}$ versus $P_{SUPPLY}$, it is understood that the map or look up table may provide a variable second threshold as a function of gaseous fuel supply pressure and other various inputs and/or values. For example, as detailed above, intake manifold pressure relates, or otherwise corresponds to, engine load and/or amount of liquid fuel being injected. Thus, the map or look up table may provide the variable second threshold as a function of gaseous fuel supply pressure and engine load or amount of liquid fuel being injected. The map or lookup tables for engine load versus $P_{SUPPLY}$ and for amount of fuel being injected versus $P_{SUPPLY}$ may be derived using similar techniques to those described above. It is understood that the map or lookup table may provide the variable second threshold as a function of any type of input as desired.

Debounce times may include predetermined time values for which a condition must be met for the predetermined amount of time to avoid false trips in the reverse flow detection method 300, as detailed below.

The reverse flow indication signal output 106 may include control of aspects of engine system 10. For example, reverse flow indication signal output 106 may include controller 104 outputting an alert, such as a light, an audible alert, an alert on a display, or the like when a reverse flow condition is triggered. Reverse flow indication signal output 106 may also include controller 104 adjusting the engine system 10. For example, controller 104 may derate or shut down engine system 10 and/or may prevent or stop the engine system 10 from operating in a gaseous fuel mode.

INDUSTRIAL APPLICABILITY

The disclosed aspects of the reverse flow detection system 100 of the present disclosure may be used in any dual fuel engine system 10.

Referring to FIG. 1, during the operation of engine system 10, the engine system may be shifted to operate in a diesel fuel only mode. During such a shift, controller 104 may send a signal to close gas shut off valve 50 and injector 46 to prevent gaseous fuel from flowing through supply line 44 from gas supply 42. Additionally, or alternatively, valve 43 may be manually actuated to the closed position to turn off the gas supply 42, as detailed above. In the diesel fuel only mode, only diesel fuel is supplied to cylinders 18. For example, controller 104 may control aspects of diesel fuel delivery system 12, such as opening a diesel fuel control valve to allow diesel fuel to flow through supply line 38 to cylinders 18 (e.g., through injectors 40). Further, intake air from intake system 16 may be supplied to cylinders 18 through intake manifold 58. Accordingly, an air and diesel fuel mixture may be drawn or forced into combustion chamber 22 during an intake stroke of piston 20. Piston 20 may cycle through compression and power (combustion) strokes and byproducts of combustion (e.g., exhaust gases) may be pushed through exhaust port 30 during an exhaust stroke. As such, pistons 20 may power crankshaft 24 to provide useful mechanical working motion to the flywheel. Thus, controller 104 may operate engine system 10 in the diesel fuel only mode via the supply line 38. During such a diesel fuel only mode, injector 46, regulator 52, and gas shutoff valve 50 may not be adequate or designed to prevent reverse flow through supply line 44. Thus, check valve 56 prevents flow of diesel fuel or intake air from reverse flowing through supply line 44.

Figure 3:
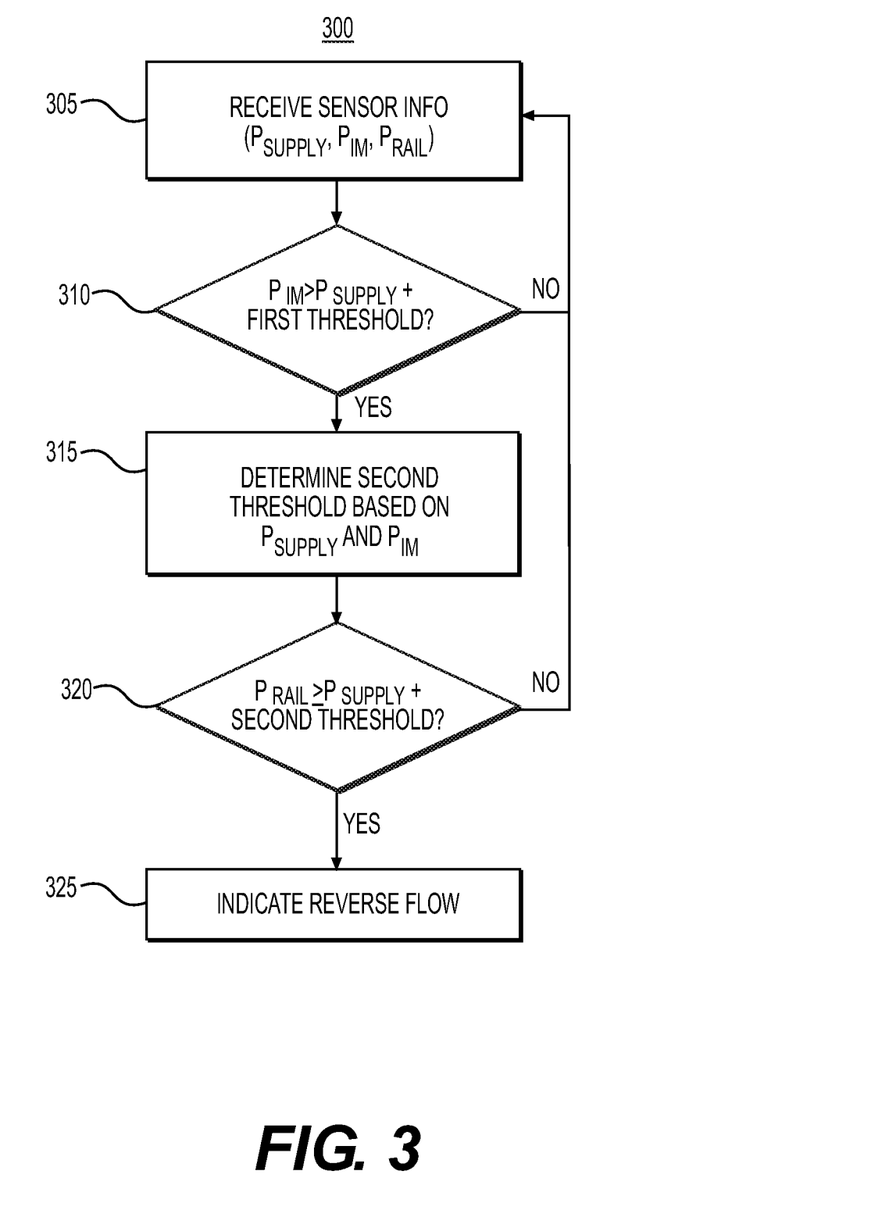
FIG. 3 provides a flowchart depicting an exemplary method for detecting reverse flow for the system of FIG. 1.

FIG. 3 illustrates a flowchart depicting an exemplary method 300 for detecting reverse flow for the dual fuel engine system 10. It is understood that the steps of method 300 may be performed when engine system 10 is operating in the diesel only fuel mode. In step 305, module 108 may receive sensor information. For example, module 108 may receive the gaseous fuel supply pressure ($P_{SUPPLY}$) signal 110, the intake manifold pressure ($P_{IM}$) signal 112, and the gaseous fuel rail pressure ($P_{RAIL}$) signal 114. In some embodiments, module 108 may also receive or derive the engine load signal and/or the amount of liquid fuel signal.

In step 310, module 108 may perform a first check and compare intake manifold pressure ($P_{IM}$) and gaseous fuel supply pressure ($P_{SUPPLY}$) plus the first threshold. In the exemplary embodiment, the first threshold may include a constant, non-varying first threshold (e.g., fixed). However, it is understood that the first threshold may include a variable first threshold based on various inputs and/or may be omitted in some embodiments. Module 108 may continuously receive the sensor information if intake manifold pressure ($P_{IM}$) is less than gaseous fuel supply pressure ($P_{SUPPLY}$) plus the first threshold (step 310: NO). If intake manifold pressure ($P_{IM}$) is greater than gaseous fuel supply pressure ($P_{SUPPLY}$) plus the first threshold (e.g., offset) (step 310: YES), module 108 may then determine the second threshold (step 315) and perform a second check (step 320). While the first check determines whether an inequality ($P_{IM} > P_{SUPPLY} +$ the first threshold) exists, it is understood that the first check may include other variations of the inequality. For example, the first check may determine whether $P_{IM} - P_{SUPPLY} >$ the first threshold, and/or may determine whether $P_{IM}$ -the first threshold $> P_{SUPPLY}$.

In step 315, module 108 may determine the second threshold based on $P_{SUPPLY}$ and $P_{IM}$. For example, module 108 may receive the values of $P_{SUPPLY}$ and $P_{IM}$ and use the map or look up table, as detailed above, to determine the second threshold based on the received values of $P_{SUPPLY}$ and $P_{IM}$. In some embodiments, module 108 may determine the second threshold based on $P_{SUPPLY}$ and engine load or amount of liquid fuel being injected to cylinder 18. For example, module 108 may receive the values of $P_{SUPPLY}$ and engine load or amount of liquid fuel being injected to cylinder 18 and use the corresponding map or look up table, as detailed above, to determine the second threshold based on the received values of $P_{SUPPLY}$ and engine load or amount of liquid fuel being injected to cylinder 18.

In step 320, when the second threshold has been determined, module 108 may then perform the second check and compare gaseous fuel rail pressure ($P_{RAIL}$) and gaseous fuel supply pressure ($P_{SUPPLY}$) plus the map-based, variable second threshold. Module 108 may continuously receive the sensor information (step 305) and then perform the first check (step 310), determine the second threshold (step 315), and/or perform the second check (step 320) if gaseous fuel rail pressure ($P_{RAIL}$) is not greater than gaseous fuel supply pressure ($P_{SUPPLY}$) plus the second threshold (step 320: NO). If gaseous fuel rail pressure ($P_{RAIL}$) is greater than or equal to gaseous fuel supply pressure ($P_{SUPPLY}$) plus the second threshold (e.g., offset) (step 320: YES), module 108 may determine a reverse flow in the gaseous fuel supply line 44. While the second check determines whether an inequality ($P_{RAIL} \geq P_{SUPPLY}$+the second threshold) exists, it is understood that the second check may include other variations of the inequality. For example, the second check may determine whether $P_{RAIL} - P_{SUPPLY} \geq$ the second threshold, and/or may determine whether $P_{RAIL}$-the second threshold $\geq P_{SUPPLY}$.

In step 325, module 108 may output an indication of reverse flow in response to the determination of reverse flow. For example, module 108 (via controller 104) may send a warning signal to a display or other user interface, derate the engine system 10, and/or send a signal to shut down engine system 10.

When in the diesel only fuel mode, if check valve 56 fails, intake air may reverse flow into supply line 44. As intake air leaks through check valve 56 into gaseous fuel supply line 44, gaseous fuel supply pressure ($P_{SUPPLY}$) may decrease below intake manifold pressure ($P_{IM}$). Likewise, gaseous fuel rail pressure ($P_{RAIL}$) may increase above gaseous fuel supply pressure ($P_{SUPPLY}$). If intake air reverse flows into gaseous fuel supply line 44, the intake air may mix with the gaseous fuel in the gaseous fuel supply line 44. Accordingly, a flammable mixture may be created because of too much air in the gaseous fuel and air mixture when the engine is operated again in the gaseous fuel mode. Module 108 may perform the first check (step 310) for redundancy to avoid false trips of detecting reverse flow. For example, reverse flow of intake air into gaseous fuel supply line 44 will not exist if gaseous fuel supply pressure ($P_{SUPPLY}$) is greater than intake manifold pressure ($P_{IM}$). However, if check valve 56 is functioning correctly (e.g., not leaking), reverse flow will not exist even if intake manifold pressure ($P_{IM}$) is greater than gaseous fuel supply pressure ($P_{SUPPLY}$) (e.g., check valve 56 will prevent reverse flow into supply line 44). Accordingly, when intake air is reverse flowing into supply line 44 (e.g., check valve 56 is leaking), gaseous fuel rail pressure ($P_{RAIL}$) will increase to, or above, intake manifold pressure ($P_{IM}$). Thus, module 108 may perform the second check (step 320) to determine if check valve 56 has failed (e.g., check valve 56 is leaking) and intake air is reverse flowing into supply line 44. While the first check and the second check are both performed by module 108 in the exemplary embodiment, it is understood module 108 may perform only the second check (step 320) to determine reverse flow in gaseous fuel supply line 44.

To avoid false trips in determining reverse flow, module 108 may also include a predetermined debounce time. For example, module 108 may compare the intake manifold pressure ($P_{IM}$) to the gaseous fuel supply pressure ($P_{SUPPLY}$) plus the first threshold (e.g., predetermined offset). If the intake manifold pressure ($P_{IM}$) is greater than the gaseous fuel supply pressure ($P_{SUPPLY}$) plus the first threshold (step 310) for the predetermined amount of time (e.g., debounce time), module 108 may determine the second threshold (step 315) and perform the second check (step 320). Likewise, if gaseous fuel rail pressure ($P_{RAIL}$) is greater than or equal to gaseous fuel supply pressure ($P_{SUPPLY}$) plus the second threshold (step 320) for the predetermined amount of time (e.g., debounce time), module 108 may determine the reverse flow in the gaseous fuel supply line 44.

Reverse flow detection system 100 may enable detection of reverse flow in the gaseous fuel delivery system 14. For example, reverse flow detection system 100 may detect and/or indicate that check valve 56, or other valves in the gaseous fuel supply line 44, is failing or has failed and intake air (e.g., boost air) is leaking into the gaseous fuel delivery system 14. Further, reverse flow detection system 100 may be robust in that different threshold values can be determined for various values of $P_{SUPPLY}$ and $P_{IM}$, engine load, or amount of liquid fuel injected to cylinder 18 Thus, false trips of detecting reverse flow may be prevented and false negatives of no detection of reverse flow may be avoided. Accordingly, reverse flow detection system 100 may help to mitigate and/or prevent safety risks associated with flammable mixtures when/if reverse flow occurs in the gaseous fuel delivery system 14. Further, reverse flow detection system 100 may utilize existing sensors of engine system 10, thus additional components may not be needed or added.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for detecting reverse flow for a dual fuel engine, the engine including an intake manifold, a liquid fuel supply line and a gaseous fuel supply line, the gaseous fuel supply line including a gaseous fuel supply and a gaseous fuel rail, the method comprising:
   receiving sensed values of gaseous fuel supply pressure, intake manifold pressure, and gaseous fuel rail pressure;
   determining a threshold value based on the sensed value of gaseous fuel supply pressure;
   determining a reverse flow in the gaseous fuel supply line based on the sensed values of gaseous fuel supply pressure and gas rail pressure and the determined threshold value; and
   adjusting operation of the engine in response to the determination of reverse flow, wherein adjusting operation of the engine includes at least one of de-rating the engine, shutting down the engine, or preventing the engine from operating in a gaseous fuel mode.

2. The method of claim 1, wherein the threshold value is determined based on a map representative of empirical data of threshold values with respect to gaseous fuel supply pressure and at least one of intake manifold pressure, engine load, or amount of liquid fuel being supplied to one or more cylinders of the engine.

3. The method of claim 1, wherein the determining the reverse flow includes:
   comparing the sensed values of gaseous fuel rail pressure and gaseous fuel supply pressure plus the threshold value; and when the gaseous fuel rail pressure is greater than or equal to the gaseous fuel supply pressure plus the threshold value, determining a reverse flow in the gaseous fuel supply line.

4. The method of claim 3, wherein the comparison of the sensed values of gaseous fuel rail pressure and gaseous fuel supply pressure plus the threshold value is a second check, and wherein the determination of reverse flow further includes a first check that includes a comparison of the sensed values of intake manifold pressure and gaseous fuel supply pressure.

5. The method of claim 4, wherein the threshold value is a second threshold value, and the first check includes:

comparing the sensed values of intake manifold pressure and gaseous fuel supply pressure plus a first threshold value; and determining that the intake manifold pressure is greater than the gaseous fuel supply pressure plus the first threshold value prior to determining the second threshold value.

6. The method of claim 5, further including:

determining that the intake manifold pressure is greater than the gaseous fuel supply pressure plus the first threshold value for a predetermined amount of time prior to determining the second threshold value.

7. The method of claim 5, further including:

determining the reverse flow in the gaseous fuel supply line when the gaseous fuel rail pressure is greater than or equal to the gaseous fuel supply pressure plus the second threshold value for a predetermined amount of time.

8. The method of claim 1, wherein the outputting the indication includes shutting down the engine.

9. A method for detecting reverse flow for a dual fuel engine, the engine including an intake manifold, a liquid fuel supply line and a gaseous fuel supply line, the gaseous fuel supply line including a gaseous fuel supply and a gaseous fuel rail, the method comprising:

receiving sensed values of gaseous fuel supply pressure, intake manifold pressure, and gaseous fuel rail pressure;

comparing the sensed values of intake manifold pressure and gaseous fuel supply pressure;

when the intake manifold pressure is greater than the gaseous fuel supply pressure, determining a threshold value based on the sensed value of gaseous fuel supply pressure, wherein the threshold value is determined based on a map representative of empirical data of threshold values with respect to gaseous fuel supply pressure and at least one of intake manifold pressure, engine load, or amount of liquid fuel being supplied to one or more cylinders of the engine;

comparing the sensed values of gaseous fuel rail pressure and the gaseous fuel supply pressure plus the threshold value;

when the gaseous fuel rail pressure is greater than or equal to the gaseous fuel supply pressure plus the threshold value, determining a reverse flow in the gaseous fuel supply line; and adjusting operation of the engine in response to the determination of reverse flow, wherein adjusting operation of the engine includes at least one of de-rating the engine, shutting down the engine, or preventing the engine from operating in a gaseous fuel mode.

10. The method of claim 9, wherein the threshold value is a second threshold value, and the method further includes:

comparing the sensed values of intake manifold pressure and gaseous fuel supply pressure plus a first threshold value; and when the intake manifold pressure is greater than the gaseous fuel supply pressure plus the first threshold value, determining the second threshold value.

11. The method of claim 10, further including:

determining that the intake manifold pressure is greater than the gaseous fuel supply pressure plus the first threshold value for a predetermined amount of time prior to determining the second threshold value.

12. The method of claim 10, further including:

determining the reverse flow in the gaseous fuel supply line when the gas rail pressure is greater than or equal to the gaseous fuel supply pressure plus the second threshold value for a predetermined amount of time.

13. The method of claim 9, wherein the outputting the indication includes shutting down the engine.

14. A reverse flow detection system for a dual fuel engine, comprising:

an intake manifold for supplying intake air to the engine;

a liquid fuel supply line for supplying liquid fuel to the engine;

a gaseous fuel supply line including a gaseous fuel supply and a gaseous fuel rail for supplying gaseous fuel to the engine; and a controller configured to:

receive sensed values of gaseous fuel supply pressure, intake manifold pressure, and gaseous fuel rail pressure;

determine a threshold value based on the sensed value of gaseous fuel supply pressure;

determine a reverse flow in the gaseous fuel supply line based on the sensed values of gaseous fuel supply pressure and gas rail pressure and the determined threshold value; and adjust operation of the engine in response to the determination of reverse flow, wherein adjusting operation of the engine includes at least one of de-rating the engine, shutting down the engine, or preventing the engine from operating in a gaseous fuel mode.

15. The system of claim 14, wherein the threshold value is determined based on a map representative of empirical data of threshold values with respect to gaseous fuel supply pressure and at least one of intake manifold pressure, engine load, or amount of liquid fuel being supplied to one or more cylinders of the engine.

16. The system of claim 14, wherein the determining the reverse flow includes the controller configured to:

compare the sensed values of gaseous fuel rail pressure and gaseous fuel supply pressure plus the threshold value; and when the gaseous fuel rail pressure is greater than or equal to the gaseous fuel supply pressure plus the threshold value, determine a reverse flow in the gaseous fuel supply line.

17. The system of claim 16, wherein the comparison of the sensed values of gaseous fuel rail pressure and gaseous fuel supply pressure plus the threshold value is a second check, and wherein the determination of reverse flow further includes a first check that includes a comparison of the sensed values of intake manifold pressure and gaseous fuel supply pressure.

18. The system of claim 17, wherein the threshold value is a second threshold value, and the first check includes the controller configured to:

compare the sensed values of intake manifold pressure and gaseous fuel supply pressure plus a first threshold value; and determine that the intake manifold pressure is greater than the gaseous fuel supply pressure plus the first threshold value prior to determining the second threshold value.

19. The system of claim 18, wherein the controller is further configured to:

determine that the intake manifold pressure is greater than the gaseous fuel supply pressure plus the first threshold value for a predetermined amount of time prior to determining the second threshold value.

20. The system of claim 18, wherein the controller is further configured to:

determine the reverse flow in the gaseous fuel supply line when the gas rail pressure is greater than or equal to the gaseous fuel supply pressure plus the second threshold value for a predetermined amount of time.

\* \* \* \* \*